Aug. 6, 1968

D. L. NEILL 3,395,608

APPARATUS FOR MEASURING THE ROUGHNESS OF THE SURFACE OF
A WORKPIECE BY METERING THE FREQUENCY OUTPUT OF A LASER
WITH THE WORKPIECE FORMING AN END REFLECTOR

Filed June 17, 1964

*INVENTOR.*
DANIEL L. NEILL

BY

*Learman, Learman & McCulloch*

ATTORNEYS

INVENTOR.
DANIEL L. NEILL
BY
*Learman, Learman & McCulloch*
ATTORNEYS

United States Patent Office 3,395,608
Patented Aug. 6, 1968

3,395,608
APPARATUS FOR MEASURING THE ROUGHNESS OF THE SURFACE OF A WORKPIECE BY METERING THE FREQUENCY OUTPUT OF A LASER WITH THE WORKPIECE FORMING AN END REFLECTOR
Daniel L. Neill, Saginaw, Mich., assignor, by mesne assignments, to Cooper Industries, Inc., Houston, Tex., a corporation of Ohio
Continuation-in-part of application Ser. No. 338,407, Jan. 17, 1964. This application June 17, 1964, Ser. No. 375,911
11 Claims. (Cl. 88—14)

This application is a continuation-in-part of my application Ser. No. 338,407 filed Jan. 17, 1964.

This invention relates to microprecision measuring instruments in general and also to particular measuring instruments or systems for measuring the roughness and waviness of the surface areas of workpieces. Various prior instruments are available and most are of the type employing stylus or tracer means to move in contact with the surface and transmit the measurements to suitable registering devices.

It is a general object of the present invention to provide a novel surface irregularity measurement instrument which is extremely accurate and practical, yet need not contact the surface being measured. The employment of such a system avoids any possibility of wearing or scratching the work surface and also avoids the inaccuracies which result from the springing of a testing probe in proceeding over the bumps and hollows of a workpiece surface. Further, such a system avoids any wearing or breaking of a relatively fine probe and the inaccuracies which result before the probe is replaced.

The present application is a continuation-in-part of my application Ser. No. 338,407, filed Jan. 17, 1964, which is directed to certain measurement systems employing a laser beam. The present application introduces the concept of utilizing the workpiece as a reflective surface and illustrates an embodiment of the concept in which surface measurement is accomplished.

A further object of this invention is to provide a highly reliable system of the character described which is capable of measurement resolution on the order of several millionths of an inch.

Still another object of the invention is to design a highly reliable and yet relatively economically manufactured device for performing extremely accurate measurement of this character which provides an accurate profile of the surface being measured.

Other objects and advantages of the invention will be pointed out specifically or will become apparent from the following description when it is considered in conjunction with the appended claims and the accompanying drawings, in which:

Figure 1:
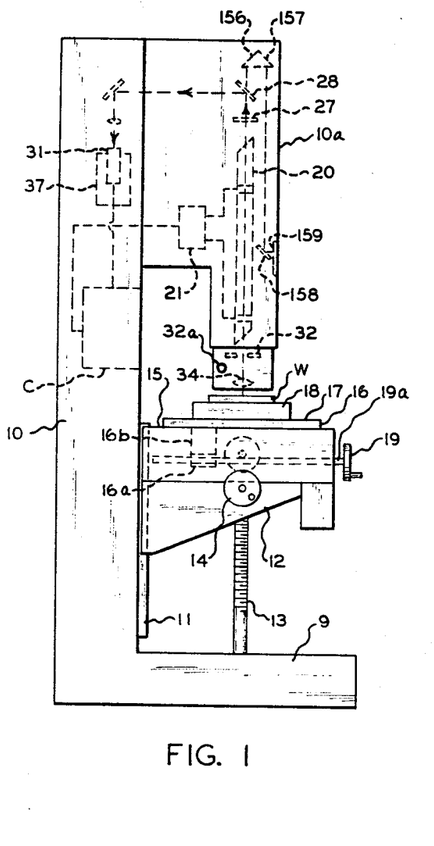
FIGURE 1 is a side elevational view schematically illustrating a surface roughness measuring machine incorporating the elements of the invention.
Figure 2:
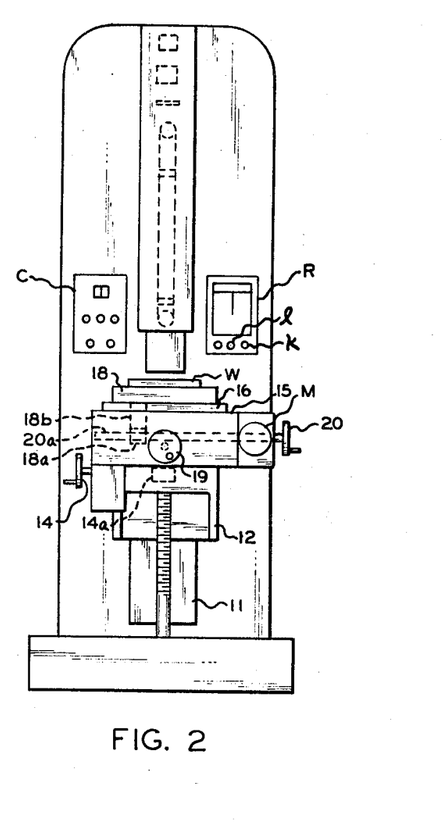
FIGURE 2 is a front elevational view thereof.

As shown in FIGURES 1 and 2, a typical machine includes a base 9 with an upright frame 10 having vertical ways 11 on which a workpiece supporting table assembly 12 is mounted for vertical movement. Mounted on the base 9 is a vertically extending, axially stationary, non-rotatable screw 13, and a handwheel and shaft assembly 14 may be connected to revolve a table mounted nut (14a) which cooperates with the screw 13 in the conventional manner to adjust the vertical position of the table assembly 12. The table 12 also includes horizontal ways 15 mounting a horizontal slide 16 and transverse ways 17 on the slide 16 mounting a transverse slide 18. A conventional hand wheel and screw shaft assembly 19 may be provided to manually adjust slide 16 and a similar conventional handwheel and screw shaft assembly 20 may be employed to permit transverse manual adjustment of the position of a workpiece W clamped in position by a suitable fixture or the like on the upper surface of the transverse slide 18. A non-rotatable nut 16a connected with slide 16 by a bracket 16b is moved axially along the rotatable but axially stationary screw shaft 19a to move slide 16 and a similar non-rotatable nut 18a, connected with slide 18 by a bracket 18b, is moved axially along the rotatable but axially stationary screw shaft 20a to move slide 18. The workpiece W is to be moved transversely at the same rate of speed as the strip of recording paper P on which a profile of the surface is traced by the pen of a conventional recorder R and for this purpose a motor M is provided which is connected to drive both the shaft 20a and the drive shaft of the recorder R.

A suitable laser measuring device of the character disclosed in my previously mentioned, co-pending application is employed in the head portion 10a of the frame 10 and it is to be understood that the measurement system disclosed herein is another embodiment of the invention disclosed in the aforementioned co-pending application.

Figure 3:
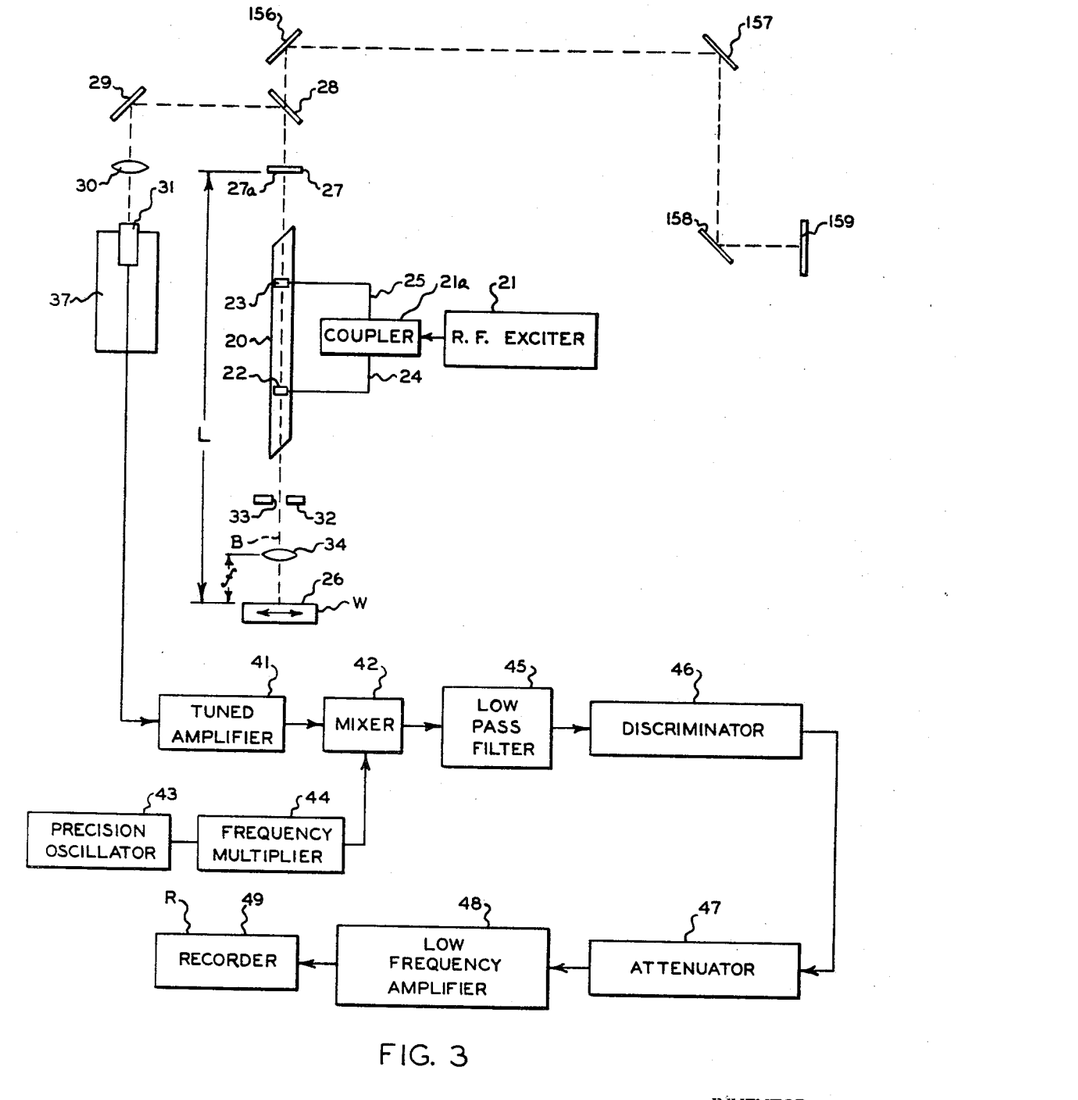
FIGURE 3 is a block diagram illustrating various elements of the machine shown in FIGURES 1 and 2.

Referring now to FIGURE 3, as well as to FIGURES 1 and 2, the optical maser or laser 20, which may be a continuous wave gas type laser, such as the Bendix gas laser manufactured by the Cincinnati division of Bendix Corporation, is shown as energized by a radio-frequency transmitter exciter 21 in the usual manner by electrodes 22 and 23 mounted on the closed quartz tube containing helium and neon gases in a proportion of preferably about ten to one by volume, respectively. A pair of RF coupler lines 24 and 25 lead from the electrodes 22 and 23 to the conventional radio-frequency exciter which incorporates a conventional RF coupler 21a. The source of radio-frequency power 21 may be the conventional transmitter referred to in the previously mentioned co-pending application which produces a frequency of 27.1 megacycles for the purpose of exciting the helium-neon gas mixture to create a stimulated emission of electromagnetic wave energy in the infra-red portion of the electromagnetic wave spectrum when reflecting surfaces at opposite ends of the laser 20 are properly aligned. The closed ends of the sealed quartz tube 20 are optically flat and slanted on an angle known as the Brewster angle, to prevent substantial reflection losses of wave energy traveling along the axis of the tube. While the so-called gas type laser is illustrated, it is to be understood that other devices providing a radiative energy stimulated emission could be provided between the upper reflector 27 and the workpiece W which, in this embodiment of the invention, serves as the opposite reflecting means.

As the previously mentioned application disclosed, the length L between the surface 27a of the reflector 27 and a surface 26 of the workpiece W or other reflector may be determined with great accuracy with devices of the character disclosed by mixing or beating at least two adjacent radiative energy frequencies which coexist in the optically resonant cavity of a continuous wave gaseous laser and detecting the resulting beat frequency with a suitable frequency detecting device. The difference frequency between the two adjacent frequencies is a function of the length L, which is the length of the resonant cavity of laser 20. As the copending application sets forward, the adjacent optical frequencies will be separated in frequency by a difference frequency equal to the velocity of the radiative energy within the optically resonant cavity divided by twice the optical length of the cavity. This relationship appertains whether the radiation generated by the stimulated emission source 20 is visible or whether the wave energy is in the so-called invisible portion of the spectrum. For purposes of the broad invention the velocity of the invisible wave energy may be considered to be the same as the speed of visible light. However, since a plurality of readings are taken and compared in the specific embodiment of the invention illustrated the velocity of the wave energy is not a factor which affects the profile obtained.

Figures 5, 6:
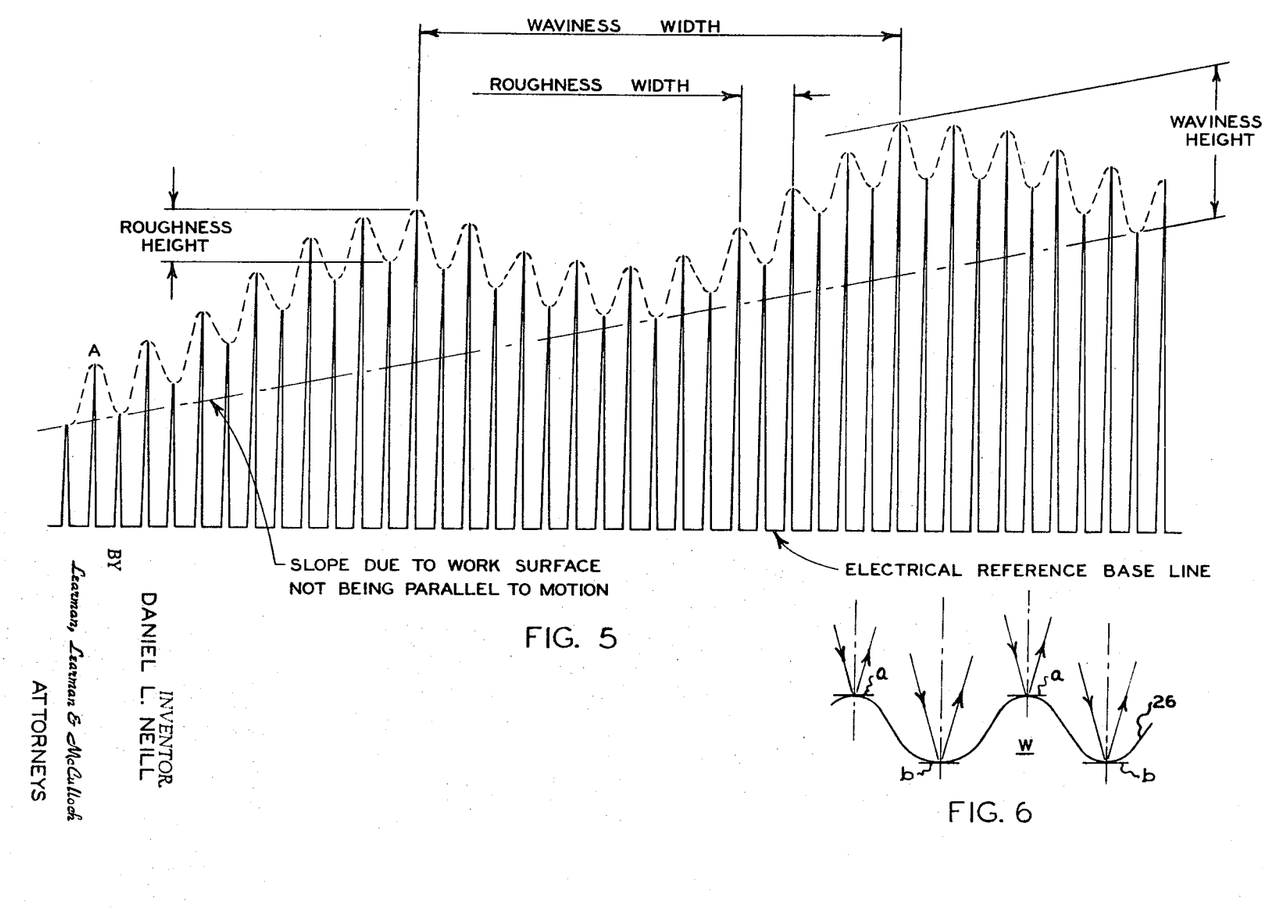
FIGURE 5 is an enlarged view illustrating a typical measurement record as traced on a strip sheet by the recorder.
FIGURE 6 is a greatly enlarged view of a work surface, illustrating the manner in which measurement occurs.

As FIGURE 6 particularly indicates, the surface 26 of a workpiece W whose surface roughness is to be measured will, when greatly enlarged, have a configuration consisting of hills or peaks, and valleys or hollows, and with the laser beam B directed at the workpiece certain finite areas as at $a$ on the peaks and $b$ in the valleys will be normal to the focused incident energy. Accordingly, resonant laser cavities will be established by a beam directed at any of the areas $a$ or $b$ and the lengths of these cavities will be different. In the present machine the workpiece is moved relatively slowly at a predetermined rate of speed transversely relative to the laser beam B which is established so that the laser beam impinges first on a surface $a$ and thence on a surface $b$. The lengths of the individual resonant cavities thus established will differ and, if compared, will determine the height of the peak surface $a$ above the valley surface $b$. As will be apparent at a later time, this is not the only roughness measurement which the instant measurement apparatus will provide.

As in the aforementioned application, the mirror reflector 27 will pass a small percentage of the radiative energy and a proportion of the wave energy thus extracted from laser 20 may be reflected by a reflector 28 to another reflector 29 and through a refracting lens 30 to a detector unit 31 which produces an electrical signal having a frequency which is a function of the length L of the resonant cavity formed and can be transmitted to the recorder R. The lens 30 may be a focussing lens or a diffusing lens, whichever is required to properly match the characteristics of the detector. Since the length L of the cavities formed will vary as the workpiece moves to permit the laser beam to scan its surface the frequency of the signal produced by the detector 31 will vary accordingly.

The laser system described, as in the aforementioned application, includes a diaphragm member 32 having an adjustable aperture 33 which controls the size and geometry of the stimulated emission beam B originating within the resonant optical cavity. In the same manner the diaphragm aperture 33 is used to restrict the beam B to a single axial mode of oscillation and to prevent the existence of all cavity resonant frequencies in the single mode of oscillation save for two adjacent cavity resonant frequencies within the doppler broadened atomic line width.

It is highly desirable to concentrate the beam B in order to provide a minimum beam spot diameter on the surface 26 of the workpiece to provide a very fine system resolution and to accomplish this a refracting objective lens 34 may be used between the diaphragm 32 and workpiece W. Both reflection and diffraction losses affect the efficency of a resonant cavity and diaphragm 32 controls the diffraction losses to the end that only two cavity resonances will have sufficient gains to produce stimulated emission. These two cavity resonances will be adjacent in frequency and near the center of the doppler broadened atomic line width.

The present system contemplates the use of the workpiece surface 26 as a beam reflector and the workpiece will not be capable of serving as a reflecting member except in a high gain system. In other words, if a particular quantum of wave energy may be considered to be generated within the gas tube, thence to proceed to the workpiece, thence to pass through the gas tube back to the reflector 27, and thence to return to the gas tube 20, the gain of the system due to stimulated emission within the tube 20 must exceed all losses including the reflection losses at the reflectors if stimulated amplification is to occur. In the system contemplated by the invention, the reflection losses at the workpiece W will be considerable and the system must have enough gain to compensate for them. Tube exit losses are minimized by using Brewster angle windows to prevent internal reflection of one polarization of the energy, and reflection losses at the reflector surfaces (such as surface 27a) opposite the ends of the laser tube 20 are usually minimized by using special dielectric coatings of a non-metallic, nonconductive nature which are designed for the particular wave length of stimulated emission anticipated. As mentioned in the co-pending application, companies such as Perkin-Elmer Company of Waltham, Mass., commercially sell mirrors which are designed for maximum reflectivity at a particular specified wave length and which are more than 99% reflective at this wave length. Such mirrors are, for instance, characterized in the Perkin-Elmer catalog received in the Scientific Library of the United States Patent Office May 27, 1963, and classified in class 331, subclass 94.5, and United States Patent No. 3,055,257, which are hereby incorporated by reference. The resonator mirror 27, which is preferably a large radius spherical mirror of the type mentioned in the co-pending application, must, of course, transmit a small portion of the electromagnetic wave energy so that it can be directed to a suitable frequency detecting system. For a particular wave length the multiple coatings applied to the mirror must be of a proper thickness and the mirror must have a proper index of refraction to provide maximum reflectivity. At the 1.153 micron helium-neon line of the spectrum the gain per pass per meter of tube length is 10% to 15% and at the 3.39 micron helium-neon spectrum line the gain becomes approximately 65% per meter of tube length. In both these instances the reflection losses can be considerable so long as they do not exceed the gain of the system and prevent the formation of a resonant cavity.

Both the 1.153 and the 3.39 micron wave lengths are in the infrared or invisible portion of the spectrum and this presents several problems. Firstly, it is desirable to have some auxiliary means to indicate the existence of a resonant cavity and a working system and, secondly, the photomultiplier tube used as a detector in the aforementioned application cannot be employed. Generally speaking at wave lengths exceeding 1.2 microns some detector other than a photomultiplier tube must be used. Since the resonator mirror 27 will have a reflectivity of at least 98%, a 62% total approximate loss at 3.39 microns can be tolerated for transmission losses through the objective 34 and reflection losses from the workpiece. Another possibility would be to employ a gas laser having a helium-xenon mixture emitting radiative energy having frequencies at the 2.026 or 3.507 micron lines which also have an approximate gain of 65% per meter of tube length. It is to be understood that systems providing energy at other optical frequencies may also be employed.

Figure 7:
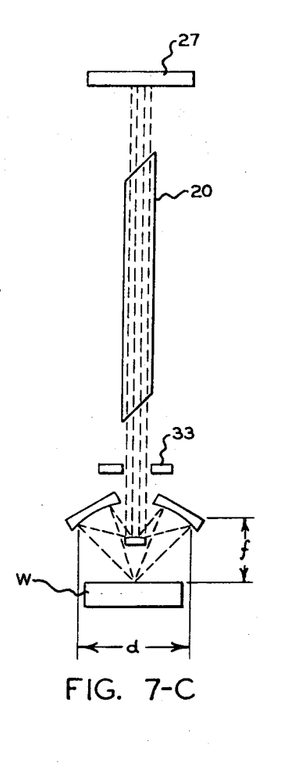
FIGURE 7A is an enlarged elevational view of the laser beam focusing system of FIGURES 1 and 3.
FIGURE 7B is a similar view of a modification thereof.
FIGURE 7C is a similar view of still a further modification thereof.

The system must also be concerned with diffraction losses. An expression which may be employed for the diffraction limited minimum possible diameter of the central fresnel spot is as follows:

$$S = 1.22\lambda \frac{f}{d}$$

where $f$ (shown in FIGURE 7A) equals the focal length or distance of the lens 34 from the workpiece W, lambda is the wave length, $d$ is the effective diameter of the system, and S is the spot diameter. This expression for S or spot diameter is, then, the smallest spot which can be focussed in a lens system and determines the resolution of the system. Clearly, the smaller $f$ is, or the larger $d$ is, the smaller S will be and the more precise the system resolution will be. The reflecting objective shown in FIGURE 7C provides a larger $d$ value and can be used to obtain an even smaller spot diameter S.

In FIGURE 7B, which illustrates a possible system in which no lens system is employed and where the workpiece W is located at the spherical radius of the spherical mirror 27, the spot will be about one millimeter or 1000 microns in diameter. In the embodiment shown in FIGURES 1 and 3 the spot size is reduced, while remaining within the diffraction limit, by the refracting lens 34 because the focal distance $f$ is reduced. In this instance a flat or a large radius (with respect to work distance) mirror may be used for the reflector 27. There will be some reflection losses at the surfaces of the lens 34 which must be taken into consideration to insure that the system has an overall gain and, of course, it must be understood that the diameter ($d$) value is limited by the inside diameter of the gas tube 20.

As noted, the preferred embodiment of the invention is illustrated in FIGURE 7C, and provides, perhaps, the smallest possible diameter spot. This system which is known as a reflecting objective system is described in English Patents Nos. 693,352; 680,221; and 25,782, and is useful in the infra-red and ultraviolet regions. The combination of lenses permits reduction of the focal distance $f$ as compared with the focal distance in FIGURE 7B, while at the same time permitting an increased $d$ value over the system illustrated in FIGURE 7A. Using even the system shown in FIGURE 7A, it is expected that a spot diameter of about 80 millionths of an inch can be achieved which, of course, is much smaller than the smallest stylus used in conventional surface measuring equipment which has a diameter of about 500 millionths of an inch.

The detector 31 may comprise a cooled indium antimonide wafer semiconductor mounted coaxially in any conventional cooling unit 37 such as a Dewar flask. Such indium antimonide detectors are described in U.S. Patents Nos. 3,128,253 and 3,131,305. Such a crystal in a system in which the wave length is 3.39 microns can be used successfully to detect the beat notes produced when the two adjacent frequencies mentioned are impressed upon its surface. The Dewar flask may be cooled by liquid carbon dioxide, nitrogen, oxygen, or helium. U. S. Patent No. 3,074,244 describes a miniature cryogenic engine which also may be employed to cool the detector.

Other optical mixers which lend themselves to bulk photoconductive mixing and detecting are the lead sulfide semiconductors which are available from Eastman Kodak Company of Syracuse, N.Y., and Infrared Industries of Waltham, Mass., the lead selenide semiconductors which are also available from Eastman Kodak Company, and the P type gold doped germanium semiconductors which are available from Radio Corporation of America and Raytheon Corporation.

*The electronics*

Figure 4:
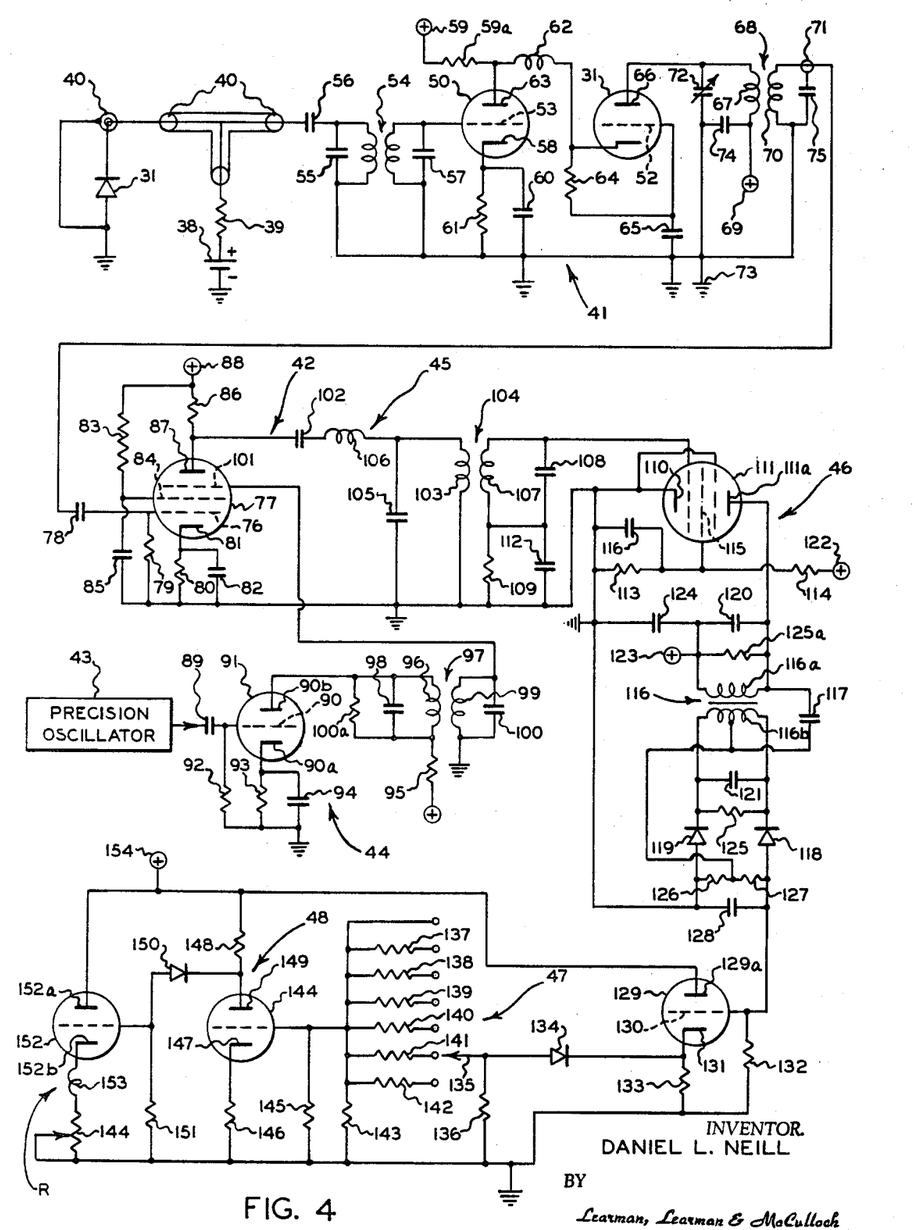
FIGURE 4 is a wiring diagram illustrating typical electronic circuits which are connected between the laser measuring assembly and the recorder which it operates.

The detector 31 shown in FIGURE 4 may be a back or reverse biased indium antimonide diode of a type made by Philco Corporation of Lansdale, Pa., (Detector Model L4540), which is supplied in a Dewar vessel. The battery 38 supplies a reverse voltage via resistor 39 to back bias the diode 31 which is coaxially mounted in a Dewar vessel or the like as noted.

Briefly, the output of the detector 31 is transmitted to a tuned radio-frequency amplifier 41 (see the block diagram) and then to a standard radio-frequency pentode mixer 42 where it is mixed with the frequency produced by a precision 1 mcs. oscillator 43 such as the Motorola 1010 multiplied by a conventional class C frequency multiplier 44. The signal emitted from the mixer 42 and transmitted through a low pass filter 45 to a discriminator 46 is higher or lower than the center frequency for which the discriminator is tuned. Finally, the direct current output from the discriminator 46 passes through a range control attenuator 47 and then to a low frequency amplifier 48 to drive a conventional strip chart recorder 49.

FIGURE 4 more particularly illustrates the electronic circuits of the units indicated in the block diagram FIGURE 3 in which the infrared wave energy is ultimately converted to a voltage whose magnitude is a function of frequency deviation from some preselected value. The units are housed in the casing C (FIGURE 2). The typical tuned amplifier circuit 41 shown in FIGURE 4 includes triode tubes 50 and 51 connected in series. A transformer 54 functions to couple the high frequency energy emitted from the detector diode 31 to the input grid 53 of amplifier 41. Capacitors 55 and 57 function to tune transformer 54 to the nominal laser cavity difference frequency, and capacitor 56 blocks the direct current flow of battery 38 from the transformer 54. The cathode 58 of tube 50 is connected to cathode resistor 61 to develop cathode bias and capacitor 60 provides bypass around resistor 61. A plate load resistor 59a connects the plate 63 of triode 50 to a direct current power source as at 59. The choke coil 62 in the output line from the triode 50 which leads from its plate 63 effectively tunes the grid to plate capacitance of the input triode to zero over the desired frequency range. The resistance 64 provides grid leak action for the grid 52 of tube 51 and the capacitor 65 in the grid ground line effectively grounds the grid at high frequencies. Connected to the plate 66 of triode 51 is the primary coil 67 of an air core transformer generally designated 68 which is connected to a direct current power source 69. The transformer secondary coil 70 is connected with a jack 71 which is connected to the mixer 42. The primary coil 67 of the transformer, together with a variable capacitor 72 which is grounded as at 73, provides a tuning circuit. A capacitor 74 which provides DC isolation for the tuned circuit is connected in the system as shown, and a capacitor 75 is provided to tune the secondary coil 70 of transformer 68.

The output of tuned amplifier 41 is coupled to the control grid 76 of pentode mixer 77 via capacitor 78 and resistor 79 provides grid leak action for the tube 77. Resistor 80, connected to cathode 81, is the cathode resistance which develops cathode bias and capacitor 82 furnishes the cathode bypass. The resistor 83 provides the bias for the screen grid 84 and capacitor 85 provides a screen grid bypass. Resistor 86 furnishes the plate load for the plate 87 of the pentode tube 77, the system being connected to a direct current power source as at 88.

The conventional precision oscillator 43 is coupled via a capacitor 89 to the grid 90 of a class C multiplier tube 91 having cathode 90a and plate 90b which is biased by resistors 92, 93 and 95. Capacitor 94 provides bypass around the cathode resistor 93. The primary coil 96 of a transformer 97 is tuned by a capacitor 98, and the secondary coil 99 of the transformer 97 is tuned by a capacitor 100 for the 144th harmonic of the input fundamental of 1 mcs., so the output will be 144 mcs. In practice, this tuning is normally done for the 3rd or 4th harmonic to give a multiplication of 3 or 4 per stage. To reach 144 requires four stages at 3×3×4×4. Resistor 100a provides damping for the tuned secondary 99 of transformer 97. The output from secondary 99 is fed to the suppressor grid 101 of the mixer pentode tube 77. In this manner the signal from amplifier 41 on grid 76 is mixed with the signal from multiplier 44 on the grid 101. The resultant output of the tube 77 is fed via capacitor 102 to the primary coil 103 of a transformer 104 which is tuned by the capacitor 105. The choke coil 106 acts as a low pass filter to remove the upper side band. The secondary coil 107 of transformer 104 is tuned by the capacitor 108, and the resistor 109 is a grid leak resistor. A capacitor 112 furnishes bypass around the resistance 109. Resistances 113 and 114 provide screen grid bias for the screen grid 115 of pentode tube 111 and capacitor 116 bypasses the screen grid. The tube 111 is biased as a limiter, so its output has a constant amplitude independent of its input amplitude. It is a sharp cut-off type tube which is alternately cut off and then saturated by the input grid voltage. The output at plate 111a, which is coupled to the primary coil 116a of a transformer 116, then has a constant amplitude but does vary in frequency.

A conventional Foster Seeley phase-shift discriminator, consisting principally of transformer 116, with its center tapped secondary 116b coupled to its primary 116a by capacitor 117, and diodes 118 and 119, will produce a DC output whose magnitude is proportional to the deviation of input frequency from a center frequency which is the frequency at which transformer 116 is tuned by capacitors 120 and 121. The screen grid 115 of tube 111 is connected to a direct current power source as at 122 and the plate 111a of tube 111 is connected to a direct current power source as at 123. Resistances 125 and 125a are damping resistors for the tuned circuit. Resistances 126 and 127 function to load the diodes 118 and 119, and capacitor 128 functions as a filter.

The direct current signal from the discriminator is fed to a conventional cathode follower triode 129 having a plate 129a connected with a direct current power source as at 154, a control grid 130, and a cathode 131. Triode 129 is biased by resistances 132 and 133. The output taken across cathode resistor 133 is coupled by Zener diode 134 to a range switch 135. Resistance 136 is required to turn on diode 134. The resistors 137–142, working in conjunction with resistor 143, form a selectable voltage divider to control the input to DC amplifier tube 144. Resistance 145 provides grid leak action for the tube 144 and cathode resistance 146, which is connected to the cathode 147 of the tube 144, provides cathode bias. The resistance 148, which is connected between the plate 149 of the tube 144 and the power source 154, provides the plate load. The output of tube 144 is Zener diode coupled via diode 150 and resistor 151, to cathode follower tube 152. Coil 153 represents the recorder pen drive motor and variable resistor 144 connected to the cathode 152b of tube 152 is used to control the current through the drive motor coil 153 and to adjust the initial position of the pen. The plate 152a of the tube 152 is also connected to power source 154.

In FIGURE 5 we have shown a typical record which may be obtained as the workpiece W passes under the objective lens 34. The drive of the paper strip P which is engaged by the pen of the recorder R is synchronized with the movement of the workpiece so that both move at the same linear speed. The recorder, Model S601S, manufactured by Esterline-Angus Co., of Indianapolis, Ind., is typical of recorders which may be used. While the actual horizontal spacing of the pips shown in FIGURE 5 will not in actual operation be as great as illustrated, the spacing used is employed to better show the detail of the profile obtained. As the workpiece W passes under the objective lens 34 and is normal to the axis of the laser gas tube, successive laser resonant cavities will be established and they will produce successive beat or difference signals having a frequency equal to $C/2L$. The beat frequencies are then converted by discriminator 46 to DC voltages which will drive the recorder pen to a point A, the recorder having been previously biased at the electrical reference base line shown in FIGURE 5. As the work travels so that the laser beam scans down the side of one peak and into an adjacent valley, no resonant cavity exists as no surface of the workpiece is normal to the axis of the gas tube 20, and since no differential frequency will exist, the recorder pen P will return to the electrical reference level, thus creating one pip. Subsequent establishments of laser resonant cavities will create subsequent pips as the work continues to move past the objective lens 34, and the peaks of these pips will form a profile of the surface being examined. As each pip will be formed at its own unique distance from the reference mirror 27 and thereby produce its own unique differential frequency the variation in heights of adjacent pips is the indication of surface roughness.

The total variation is the peak-to-valley distance as calibrated by the attenuator 47 ahead of the direct current amplifier 48 and recorder R. The gradual cyclic variation shown in FIGURE 5 represents the effect of waviness of the surface. The straight line drift up to the right may be produced in the measurement of a workpiece which is not always perfectly flat with respect to the platform on which it rests. A lack of parallelism between the surface being examined and the plane of its motion will, of course, show up as such a drift.

In order that the operator may know that the laser measuring system is operative, a portion of the electromagnetic wave energy passed through the mirror 27 is also passed through the mirror 28, the mirror 28 being so constructed that it will reflect about 50% of the radiant wave energy to the mirror 29. The radiant wave energy passing through the mirror 28 is directed to a mirror 156 and thence is reflected by mirrors 157 and 158 to a reactive instrument or surface 159 which creates a visible glow when infra-red wave energy is played upon it. The surface 159 may be the Eastman Kodak Company's Kodak IR Phosphor, which is available from its Rochester, N.Y., plant.

In operation, the workpiece whose surface is to be examined is mounted on the table 18, which may be of magnetic character to hold the workpiece in position. It will be assumed that the laser system, including its accompanying electronic devices, is operative, there being simple "start" and "stop" switches (not shown), and the "start" switch having been depressed to render the system operational. It will also be assumed that the handwheel 14 has been energized to vertically position the work surface at a proper height or distance from the objective lens 34, and handwheels 19 and 20 energized to properly horizontally and transversely position the workpiece. The operator can ascertain that the system is operational by noting the lasing pattern obtained on the phosphor plate 159, and the diaphragm controlling knob 32a (FIGURE 2) may be turned to adjust the diaphragm aperture 33 to get the proper mode pattern on the plate 159. Proper focussing of the objective lens 34 is accomplished with the handwheel 14. The recorder R has the usual bias knob $k$ (FIGURE 2) which is adjusted to set the electrical reference base line shown in FIGURE 5, and the usual range setting knob $l$.

If it is assumed that the "L" distance between the mirror surface 27a and the surface 26 of the workpiece W is approximately 41 inches, the difference frequency $f$ will be equal to $C/2L$, or 144.1 mcs. The required resolution can then be determined. For instance, to detect a roughness change of one microinch the system must then be able to detect a change of 3.5 c.p.s. out of 144.1 mcs. A change of one cycle per second would provide a limiting distance of 1/3.5 or .286 microinch. Now if a full scale range of 1000 microinches is required and one microinch equals 3.5 c.p.s., then 1000 microinches will equal 3500 c.p.s., and a maximum frequency deviation of plus or minus 4000 c.p.s. can be chosen. The output of detector 31 will then be 144,100,000 plus or minus 4000 c.p.s., and it is desirable to get a measurable reading with a frequency change of one part in 144,000,000.

In the circuit the signal of 144,100,000, plus or minus 4000 c.p.s., is beat with a precise (good to one part in $10^7$) frequency of 144,000,000 c.p.s. The difference frequency will be 100,000, plus or minus 4000 c.p.s. The precise 144,000,000 frequency is obtained by taking a one megacycle oscillator accurate to five parts in $10^{10}$ and multiplying by 144 through four multiplying stages, and the result will be accurate to 720 parts in $10^{10}$ or better than one part in $10^7$.

The lower side band output of mixer 42 will be 100,000, plus or minus 4000 c.p.s. To get one c.p.s. resolution it is necessary to detect only one part in $10^5$ and the mixer has reduced the range requirements by a factor of over 100. It would be possible to mix to 10,000, plus or minus 4000 c.p.s., in a particular measuring operation, if this were necessary.

The low pass filter 45 only lets the lower sideband pass to the discriminator 46, and the discriminator output is a DC voltage having a polarity dependent upon whether the input frequency is higher or lower than the frequency for which the discriminator is tuned. It may be assumed that the discriminator is tuned to 100,000 c.p.s., and is designed for a sensitivity of one volt per 1000 c.p.s., or one millivolt per c.p.s. Its output then will be a plus or minus 4 volts for an input of plus or minus 4000 c.p.s. The DC output from the discriminator 46 passes through the simple attenuator 47 for range control and finally through the DC amplifier 48 to the recorder R which creates a profile on the recorder strip as the workpiece moves under the laser beam.

A typical speed for the workpiece and recording strip of the recorder is .1 to .125 inch per minute. It will be possible, of course, to design the machine so that the workpiece is automatically indexed at each end of its pass. In other words, as the workpiece travels beyond the laser beam B, the table slide 16 is motor indexed an increment forwardly, while the motor M is reversed to return the slide 18 in an adjacent scanning path, and in this continuous manner the entire surface of the workpiece can be scanned.

I claim:

1. A measurement system including: a laser system comprising: a stimulated emission, electromagnetic radiation source, reflecting means bounding said source at one end and a workpiece capable of some reflection bounding said source at the other end to permit said source to emit a radiative energy beam; means for relatively moving said workpiece and source in a crosswise direction relative to the axis of the source; means for detecting the difference frequency between beam energy waves of different frequencies at which cavity resonances occur; and means for monitoring the difference frequencies detected during said relative movement.

2. In a measurement device, a laser system comprising: a laser tube; a workpiece capable of some reflection bounding said tube at one end and reflecting means bounding said tube at the other end; said reflecting means being constructed to reflect wave energy of a wave length in the infrared wave length range so that said tube issues a beam comprised substantially of energy in the infrared wave length range; means for relatively moving said laser beam and workpiece crosswise to the axis of the laser beam; means for detecting the difference frequency between the frequencies of beam energy waves at which cavity resonances occur; and means for monitoring the difference frequencies detected during said relative movement.

3. In a measurement device, a laser system comprising: a laser tube; a workpiece capable of some reflection bounding said tube at one end and reflecting means bounding said tube at the other end; said reflecting means being constructed to reflect wave energy of a wave length in the infrared wave length range so that said tube issues a beam comprised substantially of energy in the infrared wave length range; means for adjusting the emitted wave energy to issue a beam with two dominant adjacent frequencies at which resonances occur; means for relatively moving said laser beam and workpiece crosswise to the axis of the laser beam; means for detecting the difference frequency between dominant adjacent frequencies at which cavity resonances occur during said relative movement; and means for monitoring the difference frequencies detected during said relative movement.

4. In a measurement device, a laser system comprising: a stimulated emission, electromagnetic radiation source, a workpiece capable of some reflection bounding said source at one end and reflecting means bounding said source at the other end; said reflecting means being constructed to reflect substantially all of the wave energy of a wave length in the infrared wave length range so that said source issues a beam comprised substantially of energy in the infrared wave length range and also to transmit, without absorbing, other wave energy and a small proportion of the energy in the infrared wave length range; indicator means sensitive to energy transmitted through said reflecting means for indicating operability of the system; means for relatively moving said beam and workpiece crosswise to the axis of the beam; means for detecting the difference frequency between the frequencies of beam energy waves at which cavity resonances occur which are transmitted through said reflecting means; and means for monitoring the difference frequencies detected during said relative movement.

5. The combination defined in claim 4 in which means is provided for driving infrared wave length energy which is transmitted through said reflecting means and playing a portion of it upon an indicating surface sensitive to infrared wave length energy.

6. A measurement system including: a laser system comprising: a high gain, stimulated emission, electromagnetic radiation source, a workpiece capable of some reflection bounding said source at one end and reflecting means bounding said source at the other end; said reflecting means being constructed to reflect wave energy of a wave length in the infrared wave length range so that said source issues a beam comprised substantially of energy in the infrared wave length range; means for relatively moving said laser beam and workpiece crosswise to the axis of the laser beam; means for detecting the difference frequency between the frequencies of beam energy waves at which cavity resonances occur; and recorder means connected with said latter means for providing a profile of the difference frequencies detected during said relative movement.

7. A measurement system including: a laser system comprising: a high gain, stimulated emission, electromagnetic radiation source, and reflecting means bounding said source at one end and a workpiece capable of some reflection bounding said source at the other end; means for relatively moving said laser system and workpiece crosswise to the axis of the laser system; means for detecting the difference frequency between beam energy waves of different frequencies at which cavity resonances occur; and a recorder means connected with said latter means for providing a profile of the difference frequencies detected during said relative movement.

8. A measurement system including: a stimulated emission system issuing a beam of radiative wave energy comprising: an electromagentic radiation source, and reflecting means bounding said source at one end and a workpiece capable of some reflection bounding said source at the other end; means for relatively moving said beam and workpiece crosswise to the axis of the beam; means for detecting the difference frequency between beam energy waves of different frequencies at which cavity resonances occur; and means for monitoring the difference frequencies detected during said relative movement.

9. A measurement device including: a system comprising: a stimulated emission, radiative energy source; a workpiece capable of some reflection bounding said source at one end and reflecting means bounding said source at the other end; said reflecting means being constructed to reflect all but a small proportion of optical wave energy of a predetermined wave length and to transmit, without absorbing, optical energy of other wave lengths and said small proportion of the energy of the predetermined wave length; indicator means sensitive to the transmitted energy for indicating operability of the system; means for relatively moving said beam and workpiece crosswise to the axis of the beam; means for detecting the difference frequency between beam energy waves of different frequencies at which cavity resonances occur; and means for monitoring the difference frequencies detected during said relative movement.

10. The combination defined in claim 9, in which said indicator means is sensitive to wave energy of said predetermined wave length; and means is provided for dividing energy of said predetermined wave length which is transmitted through said reflecting means and playing a portion of it on said indicator means.

11. A measurement system including: a stimulated emission system comprising: a stimulated emission, radiative wave energy beam source, a workpiece capable of some reflection bounding said source at one end and reflecting means bounding said source at the other end; said reflecting means being constructed to reflect wave energy; means for relatively moving said beam and workpiece crosswise to the axis of the beam; means for detecting the difference frequency between beam energy waves of different frequencies at which cavity resonances occur; means for mixing the difference frequencies detected with a signal of precise frequency close to the range of detected difference frequencies expected to obtain reduced value difference frequencies; and means for monitoring the latter difference frequencies during said relative movement.

No references cited.

JEWELL H. PEDERSEN, *Primary Examiner.*

O. B. CHEW, *Assistant Examiner.*